United States Patent
Purho

(10) Patent No.: US 7,191,354 B2
(45) Date of Patent: Mar. 13, 2007

(54) METHOD FOR SYNCHRONIZING A FIRST CLOCK TO A SECOND CLOCK, PROCESSING UNIT AND SYNCHRONIZATION SYSTEM

(75) Inventor: Juha Purho, Helsinki (FI)

(73) Assignee: Nokia Corporation, Espoo (FI)

( * ) Notice: Subject to any disclaimer, the term of this patent is extended or adjusted under 35 U.S.C. 154(b) by 386 days.

(21) Appl. No.: 10/472,821

(22) PCT Filed: Mar. 29, 2001

(86) PCT No.: PCT/EP01/03608

§ 371 (c)(1),
(2), (4) Date: Sep. 25, 2003

(87) PCT Pub. No.: WO02/080440

PCT Pub. Date: Oct. 10, 2002

(65) Prior Publication Data

US 2004/0093435 A1    May 13, 2004

(51) Int. Cl.
*H04J 3/06* (2006.01)
(52) U.S. Cl. ............ 713/400; 713/401; 713/500; 713/501; 713/502; 713/503
(58) Field of Classification Search ........... 713/400, 713/401, 500–503
See application file for complete search history.

(56) References Cited

U.S. PATENT DOCUMENTS

| 4,694,472 | A | | 9/1987 | Torok et al. |
| 5,966,387 | A | * | 10/1999 | Cloutier ................ 370/516 |
| 6,125,368 | A | * | 9/2000 | Bridge et al. ............ 707/201 |
| 6,236,694 | B1 | * | 5/2001 | Blatter et al. ............ 375/363 |
| 6,236,971 | B1 | * | 5/2001 | Stefik et al. ............ 705/1 |
| 6,449,291 | B1 | * | 9/2002 | Burns et al. ............ 370/516 |
| 6,747,996 | B2 | * | 6/2004 | Holloway et al. ........ 370/503 |
| 6,898,642 | B2 | * | 5/2005 | Chafle et al. ............ 709/248 |

* cited by examiner

*Primary Examiner*—A. Elamin
(74) *Attorney, Agent, or Firm*—Squire, Sanders & Dempsey L.L.P.

(57) ABSTRACT

The invention relates to a method for synchronizing a first clock C to a reference clock A, the first clock C being connected to said reference clock A via a processing unit B. The invention moreover relates to a processing unit B and to a synchronization system. In order to enable a synchronization of said first clock C to said reference clock A via said processing, unti B. it is proposed that the processing unit B generates a correction message cmsg for the first clock C based on timestamps exchanged between the processing unit B and the reference clock A, which exchanged of timestamps is triggered by clock pulses cclk received in the processing unit B from the first clock C.

23 Claims, 1 Drawing Sheet

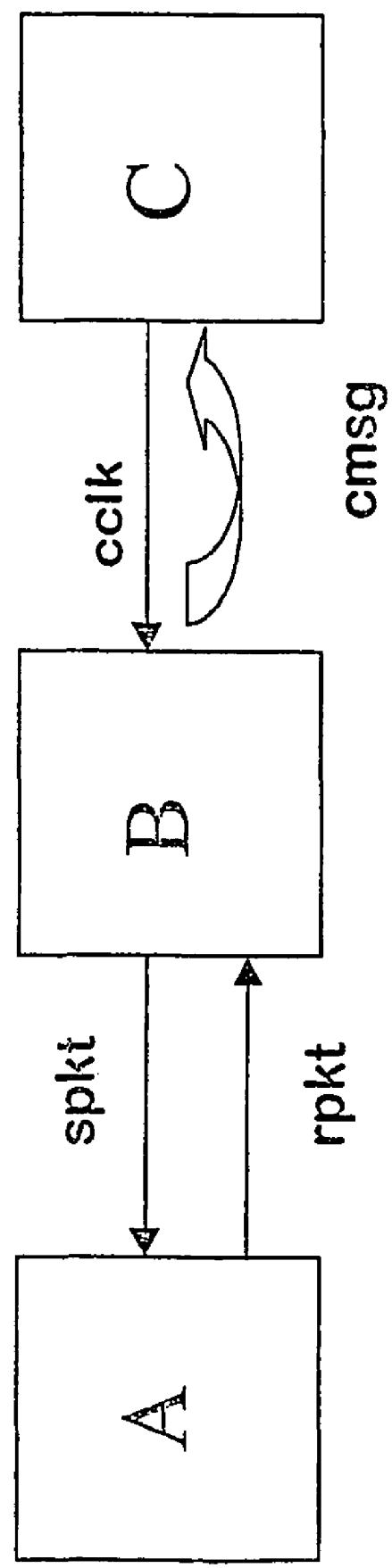

METHOD FOR SYNCHRONIZING A FIRST CLOCK TO A SECOND CLOCK, PROCESSING UNIT AND SYNCHRONIZATION SYSTEM

FIELD OF THE INVENTION

The invention relates to a method for synchronizing a first clock to a reference clock. The invention equally relates to a processing unit and a synchronization system including a first clock connected via a processing unit to a reference clock.

BACKGROUND OF THE INVENTION

A possibility of synchronizing a first clock to a reference clock used as an accurate time server can constitute an important feature in a variety of systems, in particular in systems in which several clocks have to work synchronously.

A known and accurate method for synchronizing a first clock to a second clock is based on the network time protocol (NTP). A calculation of offsets between two different clocks based on NTP is described for example by David L. Mills in: "Internet Time Synchronization: the Network Time Protocol", IEEE Trans. Communications 39, 10 (October 1991), 1482–1493. The Network Time Protocol and related nomenclature is also described in the Internet draft by David L. Mills: "Network Time Protocol (Version 3) specification, implementation and analysis. Network Working Group Report" RFC-1305, University of Delaware, Mar. 1992.

According to the document "Internet Time Synchronization: the Network Time Protocol", in order to determine the offset between a time server and a peer, i.e. one of several clocks that are to be synchronized to the time server, an NTP message is sent from the server to the peer. Subsequently, another NTP message is sent from peer to server. A timestamp is generated for each point of time in which a NTP message is transmitted or received. Each NTP message includes the latest three generated timestamps, i.e. a timestamp for indicating the time of transmission and reception of the previous message and a timestamp indicating the time of transmission of the current message. A fourth timestamp indicating the time of reception of the current message is determined upon arrival of the message.

In the document, the offset $\Theta_i$ of the peer relative to the server is determined to $$\Theta_i = \frac{a+b}{2},$$

where a is the difference between reception of the first message and transmission of the first message, while b is the difference between transmission of the second message and reception of the second message. The effect of statistical errors and falsetickers can be minimized by the use of rather complex filtering and selection algorithms described in the above mentioned Internet draft RFC-1305.

The same method could be applied for synchronizing two or more peer clocks of which only some are connected directly to a time server, but where each peer is connected at least via another peer to the time server. In such a system, the time server constitutes a primary server NTP clock for all directly connected client NTP clocks. These client NTP clocks form at the same time server NTP clocks for other client NTP clocks connected to them, and so forth.

It is not always possible, though, to implement an NTP client in the element with a clock that is to be synchronized. Therefore, an alternative option is required for synchronizing a clock to a reference clock indirectly, in particular via some processing unit. An obvious solution would then be to use the processing unit as NTP client that is synchronized to a reference clock of an NTP server and to synchronize the third clock based on the inaccurate clock.

However, such a processing unit may constitute a weak link in the connection between the clock that is to be synchronized and the reference clock, e.g. if the processing unit is an element with a clock that is less accurate than the clock which is to be synchronized. For many applications, therefore, such a proceeding does not lead to a satisfying accuracy of synchronization.

SUMMARY OF THE INVENTION

It is an object of the invention to provide a method, a processing unit and a system that enable a synchronization of a first clock to a reference clock via a processing unit.

This object is reached on the one hand with a method for synchronizing a first clock to a reference clock, the first clock being connected to said reference clock via a processing unit, wherein said processing unit generates a correction message for the first clock based on timestamps exchanged between the processing unit and the reference clock, which exchange of timestamps is triggered by clock pulses received by the processing unit from the first clock.

On the other hand, the object is reached with a processing unit. According to the invention, such a processing unit comprises means for receiving clock pulses from a first clock which is to be synchronized to a reference clock and means for exchanging timestamps with the reference clock, the exchange being triggered by clock pulses received from the first clock. It further comprises means for generating correction messages for the first clock based on exchanged timestamps. Moreover, the processing unit comprises means for transmitting the generated correction messages to the first clock.

Finally, a synchronization system is proposed which reaches the object of the invention. The synchronization system includes a first clock connected via a processing unit to a reference clock, which first clock is to be synchronized to said reference clock. The processing unit of the synchronization system comprises the same means as the processing unit of the invention. The reference clock includes corresponding means for exchanging timestamps with the processing unit. And the first clock includes means for transmitting clock pulses to the processing unit, means for receiving correction messages from the processing unit and means for adjusting its frequency according to the received correction messages.

The invention proceeds from the idea that clock pulses from a first clock that is to be synchronized to a reference clock can be used in determining the necessary adjustments of the first clock, even if the adjustments are determined by some third element, i.e. some processing unit. With this approach, a processing unit which connects the first clock with a reference clock can evaluate timestamps transmitted between the processing unit and the reference clock in some known way for determining necessary adjustments. However, instead of basing the timestamps that are exchanged by the processing unit with the reference clock on clock signals of a clock in the processing unit, the timestamps are based at least partly on clock pulses received by the processing unit from the first clock that is to be synchronized. Since the timestamps are therefore already related to the current state of the first clock, they are particularly well suited for determining necessary adjustments and thus for generating correction message, and a faster and more accurate synchronization can be achieved.

The invention can be used in particular for synchronizing a reasonably accurate first clock to an accurate reference clock, while the processor is working with a rather inaccurate clock which is at least less accurate than the first clock.

Preferred embodiments of the invention become apparent from the subclaims.

The clock pulses received at the processing unit from the first clock will usually arrive in regular intervals. This is not a necessary requirement, however. For example, the processing unit can tell the first clock when to send the next pulse. Further, the clock pulses from the first clock can also take the form of interrupts.

In case only the rate of the clock pulses of the first clock is to be synchronized to the rate of the clock pulses of the reference clock, it is proposed that the correction message is generated in the processing unit with the following sequence of steps. First, a starting point offset is determined based on timestamps exchanged between the processing unit and the reference clock. This starting point offset is the offset at some first point of time. Next, the offset between the first clock and the reference clock is determined at further points of time based on further timestamps exchanged between the processing unit and the reference clock. For each of these further determined offsets the difference to the starting point offset is calculated. Finally, a value is inserted into a correction message to the first clock which represents the difference between the respective offsets. A correction message can be sent by the processing unit to the first clock for each offset determined after the starting point offset. Alternatively, a correction message can only be sent in case the difference exceeds a predetermined threshold value, and in addition, it can be provided that such a threshold value has to be exceeded for a predetermined time or for a predetermined number of calculated differences. Only a frequency reference may be needed for example in some cases of GSM/GPRS (Global System for Mobile Communications/General Packet Radio Service) and EDGE (Enhanced Data GSM Environment), and in the case of WCDMA (Wideband Code Division Multiple Access) FDD (Frequency Division Duplex).

In general, the invention can be employed for adjusting only the frequency of the first clock according to correction messages and thereby according to the frequency of the reference clock, or in addition for adjusting also the phase of the first clock according to correction messages and thereby according to the phase of the reference clock.

The correction message is preferably generated based on measured values of time offset and/or frequency which are measured with the exchanged timestamps using a timestamp method.

More preferably, the time-stamp method is the Network Time Protocol between the reference clock employed as Network Time Protocol server and the processing unit employed as Network Time Protocol client. It is an advantage of the invention that for this approach, a change of the NTP itself is not required. Only the generation of the timestamps included in the NTP messages is adjusted in a way that enables an accurate synchronization of the first clock. Thus, based on the exchange of NTP messages including timestamps, the offset between the first clock and the reference clock can be determined in a way known for the determination of the offset between two directly connected clocks, as described for example in the mentioned document "Internet Time Synchronization: the Network Time Protocol". Any other method using an exchange of timestamps for calculating the offset between two clocks in a reliable way can be employed just the same, though. The determined offset can then be used for adjusting the first clock by transmitting a corresponding correction message.

In a more general preferred embodiment of the invention, the timestamps that are to be transmitted by the processing unit to the reference clock indicate their expected time of transmission and are included in synchronization messages that are assembled in advance. These synchronization messages can then be transmitted as soon as a triggering clock pulse is received by the processing unit from the first clock. The expected time of transmission is therefore the point of time of the next clock pulse to be received from the first clock, which is supposed to be known.

There are a variety of possibilities for the processing unit of knowing the time of the next clock pulse to be received from the first clock. For example, the interval between the clock pulses received from the first clock can be known at the processing unit. The time of reception of the triggering clock pulse can then be determined in the processing unit based on the number of intervals between some starting point and the triggering clock pulse or based on a stored point of time indicating the time of reception of the last clock pulse to which one time interval is added. Any further alternative can be employed just the same.

In any case, the best clock information available in the processing unit, i.e. the clock information of the first clock, is used for timestamp creation and no time is wasted creating the packet after the triggering clock pulse; thus this approach makes the synchronization faster compared to an assembling after the triggering clock pulse and further improves the accuracy of the synchronization.

A timestamp indicating the point of time of transmission of a synchronization message by the processing unit is formed preferably from the sum of a predetermined starting time and the time interval between pulses received at the processing unit from the first clock multiplied by the number of pulses received since the starting time. Optionally, a change of offset determined after the most recent correction message, which change of offset has not been conveyed to the first clock yet, can be added to the sum, which makes the timestamp even more exact.

For the further exchange of timestamps that are to enable a determination of an offset between the first clock and the reference clock and therefrom of a correction message for the first clock, the reference clock preferably transmits upon receipt of the synchronization message from the processing unit a response message to the processing unit. This response message can in particular include the timestamp received in the synchronization message, a timestamp indicating the point of time at which the synchronization message was received at the reference clock and a timestamp indicating the point of time at which the response message is transmitted by the reference clock. The processing unit moreover determines a fourth timestamp which indicates the point of time of receipt of the response message based at least primarily on the latest clock pulse (cclk) received from the first clock. In addition, it can be based secondarily on an internal clock of the processing unit. Finally, the processing unit can generate a correction message based on the timestamp information e.g. using the NTP method described in above mentioned Internet draft RFC-1305. In particular, the correction message can be based on a frequency offset determined based on these timestamps.

It is to be noted that a correction message does not have to be generated based on every single exchange of timestamps. NTP implementations, e.g., regularly employ filters that filter out most of the exchanged synchronization messages. Actually, a reasonably long time with a big number of synchronization messages is needed to generate an accurate offset. Therefore, a correction message can be generated for example each time when the timestamp method produced the latest measured offset.

In order to relate this last timestamp again to the clock pulses of the first clock, the determination can be based on the sum of the time intervals between the clock pulses received from the first clock since the transmission of the synchronization message. Therefore, also the reception of the response packet can be timestamped with the most exact time information available at the processing unit. Similarly as proposed as an alternative for determining the first timestamp, a stored point of time of the respective latest clock pulse received from the first clock can be used as basis for determining the fourth timestamp. This eliminates the need of calculating the reception time from some distant starting point.

In a particularly suited approach, the time of receipt of the response message is determined in the processing unit as sum of the point of time at which the synchronization message was transmitted, the time interval between clock pulses from the first clock multiplied by the number of clock pulses received after the transmission of the synchronization message, and the time elapsed between the reception of the response message and the reception of last clock pulse from the first clock before reception of the response message. This last time can be determined with a clock integrated in the processing unit. It is assumed for this approach that the granulation of the clock integrated in the processing unit is higher than the granulation of the first clock. In practice, the time of receipt of the latest clock pulse from the first clock can be stored in the processing unit an used in the sum in order to avoid unnecessary calculations.

The processing unit can in particular be a PC, wherein the first clock is a hardware clock external to the PC. But the processing unit can be any such device based on general-purpose processor that is capable of acting as a processing unit.

The method, the processing unit and the synchronization system of the invention can be employed in particular for synchronizing an IP RAN (Internet Protocol Radio Access Network) base station, like a GSM base stations over IP. With the method of the invention, the master clock of an IP BTS (Base Transceiver Station) can be synchronized for example to an external reference clock, e.g. the master clock of another BTS, via the BTS transmission unit of the first BTS site. As a result, the necessity of installing a local GPS (Global Positioning System) timing device on every IP BTS site can be avoided, the local GPS timing device being rather expensive and a transmission network based synchronization not always being available in an IP network.

BRIEF DESCRIPTION OF THE FIGURES

In the following, the invention is explained in more detail with reference to a drawing. The only figure shows a block diagram of an embodiment of a synchronization system according to the invention.

DETAILED DESCRIPTION OF THE INVENTION

The synchronization system that is shown schematically in the figure is composed of a first element A with a first clock, a second element B with a second clock and a third element C with a third clock. The second element B is located between the first and the second element A, C and interconnects them. The data link between elements A and B does not have to be synchronous. The link can therefore be for example an IP link.

The first element A is an NTP server anywhere in the synchronization system, and the included first clock is to be used as reference clock in the system. The first element A can be for example arranged in a base station of a cellular communications network and the included first clock can be an accurate clock based on a GPS device. The second element B is a general-purpose processor based device, e.g. a PC, used as a BTS transmission unit of a second BTS site, the clock of which is rather inaccurate. The second element B includes an implementation of an NTP client and its clock has a granularity of $\tau_1$, which is typically in the range of ins to 1 µs. The third element C contains the master clock of the second base station. This master clock, which is reasonably accurate, regularly sends clock pulses cclk to element B in time intervals of $\Delta T_1$. For the interval $\Delta T_1$ it is supposed that $\Delta T_1 > 96_1$, more specifically even that $\tau T_1 >> \tau_1$. This is, however, not a necessary requirement. The reason for the assumption is simply that if the granularity $\tau_1$, was greater than the time interval $\Delta T_1$, the clock pulse cclk received from element C would represent the best clock signal for element B, rendering B's own clock signal useless.

The third clock in the third element C is to be synchronized reliably to the first clock in the first element A over the inaccurate element B. More precisely, the frequency used by the clock of element C should be kept equal to the frequency used the clock of element A with a deviation $\Delta \tau_2$ that is much smaller than the interval $\Delta T_1$ between two clock pulses cclk transmitted by the clock in element C.

In the following it will be explained how the desired synchronization is achieved with the method of the invention.

In a first step, a starting point offset between the clock in element C and the accurate clock in element A is determined in element B. After that, the offset between the two clocks is subsequently measured in intervals $\Delta T_2$ that fixed to be a predetermined multiple N of the interval $\Delta T_1$ between the clock pulses cclk received at element B from the clock of element C, i.e. $\Delta T_2 = N * \Delta T_1$, with N being an integer and with $N >> 1$.

The respective offsets are calculated in element B as described above with reference to the document "Internet Time Synchronization: the Network Time Protocol". In order to obtain the required information for such a calculation, element B sends a synchronization packet spkt to element A. The synchronization packet spkt contains a timestamp indicating the exact point of time at which the synchronization packet spkt is transmitted. Element A responds with a response packet rpkt that contains the timestamp received in the synchronization packet spkt, a timestamp indicating the exact point of time at which element A received the synchronization packet spkt, and a timestamp indication the exact point of time at which element A sends the response packet rpkt to element B. Finally, element B has to determine a timestamp indicating the exact point of time at which the response packet rpkt is received from element A. The four timestamps required for determining the offset based on the known NTP method are then available at element B. Each offset is preferably determined based on a cluster of synchronization packets spkt transmitted from element B to element A and the respective response packets rpkt. The interval for individual packets sent within the cluster have to be longer than the roundtrip of the synchronization packet spkt and its response.

Element B with the most inaccurate of the three clocks in the synchronization system is responsible for determining two of the timestamps needed for determining the offsets. This embodiment of the invention constitutes an advantageous way of basing the determination of the timestamps in element B mainly on the output of the reasonably accurate clock in element C instead of on the output of the inaccurate clock of element B.

The first timestamp for which element B is responsible is the timestamp indicating at what point of time a synchronization packet spkt is sent from element B to element A. The timestamp for the starting point offset, which indicates at the same time a starting time $T_0$, may be arbitrary, but it is convenient if it is reasonably close to the correct time exhibited by A. Since the following offsets are to be determined in intervals $\Delta T_2$ dependent on a multiple N of the time interval $\Delta T_1$ between clock pulses cclk received from element C, element B can determine in advance the point of time $T_s$ at which each synchronization packet spkt will be transmitted. The respective point of time $T_s$ of transmission is determined in element B as the sum of the starting time $T_0$ and the time of the intervals $\Delta T_2$ passed until the respective transmission, $T_s = T_0 + K*\Delta T_2$, K starting from 0 for the starting point offset and being increased in steps of 1 for every subsequent offset measurement. In addition, the change of offset measured based on the most recent exchange of timestamps that has not been conveyed to element C yet can be included in the starting time $T_s$. It is however optional to take this change of offset into account. With the knowledge of the point of time $T_s$ at which the $K^{th}$ synchronization packet spkt will be transmitted to element A, element B can therefore prepare the $K^{th}$ synchronization packet spkt including the timestamp indicating the time of transmission of the packet spkt well in advance before it has to be transmitted.

When element B receives the corresponding triggering clock pulse cclk from element C, which is the $(N*K)^{th}$ clock pulse cclk received after the starting time $T_0$, it can immediately send the $K^{th}$ synchronization packet spkt to element C.

Thus, the most accurate available clock pulses, i.e. the clock pulses cclk of the clock in element C, are used in element B for creating the timestamps for the synchronization packets spkt. Moreover, since the synchronization packets spkt can be created in advance, no time is lost in creating the packets spkt after the triggering clock pulse cclk. Therefore, a better accuracy is achieved for the first timestamp compared to a determination based only on the clock in element B and the synchronization can be carried out as fast as possible.

The second timestamp for which element B is responsible is the timestamp indicating at what point of time $T_R$ a response to the synchronization packet spkt is received at element B from element A. In order to be able to determine this timestamp, element B counts the number L of clock pulses cclk received from element C beginning with the point of time $T_s$ at which the synchronization packet spkt is transmitted to element A. In addition, element B determines the time $T_\gamma$ elapsed between the last clock pulse cclk received from element C before the response packet rpkt from element A is received and the arrival of the response packet rpkt itself. This time span $T_\gamma$ is determined according to the internal clock of element B and is fairly accurate for the rather short time span $T_\gamma$, since it was supposed that $\Delta T_1 >> \tau_1$. The number L of counted clock pulses cclk together with the known time interval $\Delta T_1$ between the pulses cclk and the additional time span $T_\gamma$ enable a determination of the point of time $T_R$ at which the response packet rpkt is received by element B. The corresponding equation for the point of time $T_R$ needed for determining the respective offset is: $T_R = T_s + L*\Delta T_1 + T_\gamma$. In case $\Delta T_1$ is smaller than $\gamma_1$ the last term is omitted. The point of time $T_R$ at which the response packet rpkt is received by element B can be calculated at any time after the packet was received.

Thus, an accurate result is obtained for the point of time $T_R$ by using at least mainly the clock pulses cclk from the clock of element C, which are more accurate than the clock signal of the clock of element B. Moreover, the final calculation of TR can be executed at any point of time when there is free CPU capacity.

The offsets can thus be calculated in regular intervals from the respective response packets rpkt received by element A and the respective determined reception time $T_R$.

The determined starting point offset and the subsequently determined offsets can then be used by the element B to cause adjustments of the clock in element C. To this end, it is determined by element B whether the measured offset deviates from the starting point offset over a threshold value $\Delta \tau_0$, with $\Delta T_1 >> \Delta \tau_0$, for a time of $M*\Delta T_1$, where M is some predetermined parameter. In case such a relevant deviation is detected, element C is informed by element B with a correction message cmsg, the message cmsg including an indication how much the clock must advance or delay its timing in order to maintain a clock pulse cclk rate synchronous to the clock pulse rate of the clock in element A. The amount and direction of the required adjustment is determined in the element B from the difference between the actual offset and the starting point offset.

The described synchronization enables to achieve a precision of synchronization with a deviation $\Delta \tau_2$ with $\Delta \tau_2 << \Delta T_1$. This in turn implies an accuracy of the frequency of the clock in element C of $\Delta f \approx \Delta \tau_2 / T$, over a period of time T.

The invention claimed is:

1. A method comprising:
    synchronizing a first clock to a reference clock, the first clock being connected to said reference clock via a processing unit, wherein said processing unit generates a correction message for the first clock based on timestamps exchanged between the processing unit and the reference clock, which exchange of timestamps is triggered by clock pulses received by the processing unit from the first clock, and
    wherein the correction message is generated based on measured values of a time offset between the first clock and the reference clock and/or a deviation in frequency between the first clock and the reference clock, the values of time offset and/or deviation of frequency being measured with said exchanged timestamps using a timestamp method.

2. The method according to claim 1, wherein generating a correction message in the processing unit includes
    determining at a first point of time the offset between said first clock and said reference clock as starting point offset based on timestamps exchanged between said processing unit and said reference clock;

determining at further points of time the offset between said first clock and said reference clock based on timestamps exchanged between the processing unit and said reference clock;

determining for each offset determined at a further point of time the difference to the starting point offset; and including a value representing said determined difference in said correction message to the first clock.

3. The method according to claim 1, wherein the timestamp method is the Network Time Protocol between the reference clock employed as Network Time Protocol server and the processing unit employed as Network Time Protocol client.

4. The method according to claim 1, wherein for exchanging timestamps, said processing unit assembles in advance a synchronization message to be sent to the reference clock including a timestamp indicating the expected time of the transmission of the synchronization message, the expected time being a known point of time of the next clock pulse to be received from the first clock.

5. A method according to claim 4, wherein the timestamp in the synchronization message is based on the sum of a predetermined starting time, of the time interval between clock pulses from the first clock multiplied by the number of clock pulses expected to be received between the starting time and the transmission of the synchronization message, and of a change of offset between the first clock and the reference clock determined after the generation of the most recent correction message.

6. The method according to claim 4, wherein upon receipt of the synchronization message, the reference clock transmits a response message to the processing unit including the timestamp received in the synchronization message, a timestamp indicating the point of time at which the synchronization message was received by the reference clock and a timestamp indicating the point of time at which the response message is transmitted by the reference clock, wherein the processing unit determines a timestamp indicating the point of time of receipt of the response message based at least primarily on the latest clock pulse received from the first clock, and wherein the processing unit generates a correction message based on the timestamps in the response message and on the determined timestamp indicating the point of time of receipt of the response message.

7. The method according to claim 6, wherein the time of receipt of the response message is determined in the processing unit as sum of the point of time at which the synchronization message was transmitted, the time interval between clock pulses from the first clock multiplied by the number of clock pulses received since the transmission of the synchronization message, and the time elapsed between the reception of the response message and the reception of last clock pulse from the first clock before reception of the response message according to a clock integrated in the processing unit, wherein the granulation of the clock integrated in the processing unit is higher than the granulation of the first clock.

8. The method according to claim 6, wherein the processing unit stores the time of receipt of the latest clock pulse received from the first clock, and wherein the time of receipt of the response message is determined in the processing unit as the sum of the stored time of receipt of the latest clock pulse and the time elapsed between the reception of the response message and the reception of last clock pulse from the first clock before reception of the response message according to a clock integrated in the processing unit, wherein the granulation of the clock integrated in the processing unit is higher than the granulation of the first clock.

9. A processing unit comprising:

means for receiving clock pulses from a first clock which is to be synchronized to a reference clock, means for exchanging timestamps with said reference clock, the exchange being triggered by clock pulses received from said first clock, means for generating correction messages for said first clock based on said exchanged timestamps, and means for transmitting said generated correction messages to said first clock, wherein the correction message is generated based on measured values of a time offset between the first clock and the reference clock and/or a deviation in frequency between the first clock and the reference clock, the values of time offset and/or deviation of frequency being measured with said exchanged timestamps using a timestamp method.

10. The processing unit according to claim 9, wherein the means for exchanging timestamps are designed to generate timestamps based on clock pulses received from the first clock.

11. The processing unit according to claim 9, wherein the means for exchanging timestamps form a part of an Network Time Protocol client integrated in the processing unit.

12. A synchronization system comprising:

a first clock connected via a processing unit to a reference clock, which first clock is to be synchronized to said reference clock, wherein the processing unit includes means for receiving clock pulses from said first clock, means for exchanging timestamps with said reference clock, the exchange being triggered by clock pulses received from said first clock, means for generating correction messages for said first clock based on said exchanged timestamps, and means for transmitting said generated correction messages to said first clock, wherein said reference clock includes means for exchanging timestamps with said processing unit, and wherein the first clock includes means for transmitting clock pulses to the processing unit, means for receiving correction messages from said processing unit and means for adjusting the frequency of said first clock according to said correction messages, wherein the correction message is generated based on measured values of a time offset between the first clock and the reference clock and/or a deviation in frequency between the first clock and the reference clock, the values of time offset and/or deviation of frequency being measured with said exchanged timestamps using a timestamp method.

13. The synchronization system according to claim 12, wherein said means of said first clock for adjusting the frequency of said first clock according to said correction messages are further suited for adjusting the phase of said first clock according to said correction messages.

14. The synchronization system according to claim 12, wherein the means for synchronizing in the processing unit are designed to determine timestamps based on clock pulses received from the first clock.

15. The synchronization system according to claim 12, wherein the reference clock is included in an Network Time Protocol server and wherein the processing unit includes an Network Time Protocol client, the timestamps being exchanged in Network Time Protocol messages between the Network Time Protocol server and the Network Time Protocol client.

16. The synchronization system according to claim 12, wherein the processing unit is a PC, and wherein the first clock is a hardware clock external to the PC.

17. The synchronization system according to claim 12, wherein the first clock and the processing unit are integrated in a Global System for Mobile Communications base station, the first clock being the master clock of the base station and the processing unit being a Base Transceiver Station transmission unit.

18. A processing unit comprising:
- a receiving unit configured to receive clock pulses from a first clock which is to be synchronized to a reference clock,
- an exchanging unit configured to exchange timestamps with said reference clock, the exchange being triggered by clock pulses received from said first clock,
- a generating unit configured to generate correction messages for said first clock based on said exchanged timestamps, and
- a transmitting unit configured to transmit said generated correction messages to said first clock,
- wherein the correction message is generated based on measured values of a time offset between the first clock and the reference clock and/or a deviation in frequency between the first clock and the reference clock, the values of time offset and/or deviation of frequency being measured with said exchanged timestamps using a timestamp method.

19. The processing unit according to claim 18, wherein the exchanging unit is further configured to generate timestamps based on clock pulses received from the first clock.

20. The processing unit according to claim 18, wherein the exchanging unit forms a part of an Network Time Protocol client integrated in the processing unit.

21. A synchronization system comprising:
- a first clock connected via a processing unit to a reference clock, which first clock is to be synchronized to said reference clock,
- wherein the processing unit includes a receiving unit configured to receive clock pulses from said first clock, an exchanging unit configured to exchange timestamps with said reference clock, the exchange being triggered by clock pulses received from said first clock, a generating unit configured to generate correction messages for said first clock based on said exchanged timestamps, and a transmitting unit configured to transmit said generated correction messages to said first clock,
- wherein said reference clock includes an exchanging unit configured to exchange timestamps with said processing unit, and wherein the first clock includes a transmitting unit configured to transmit clock pulses to the processing unit, a receiving unit configured to receive correction messages from said processing unit and an adjusting unit configured to adjust the frequency of said first clock according to said correction messages, and
- wherein the correction message is generated based on measured values of a time offset between the first clock and the reference clock and/or a deviation in frequency between the first clock and the reference clock, the values of time offset and/or deviation of frequency being measured with said exchanged timestamps using a timestamp method.

22. The synchronization system according to claim 21, wherein said adjusting unit is further configured to adjust the phase of said first clock according to said correction messages.

23. The synchronization system according to claim 21, wherein the processing unit is configured to determine timestamps based on clock pulses received from the first clock.

* * * * *